Figure 1:
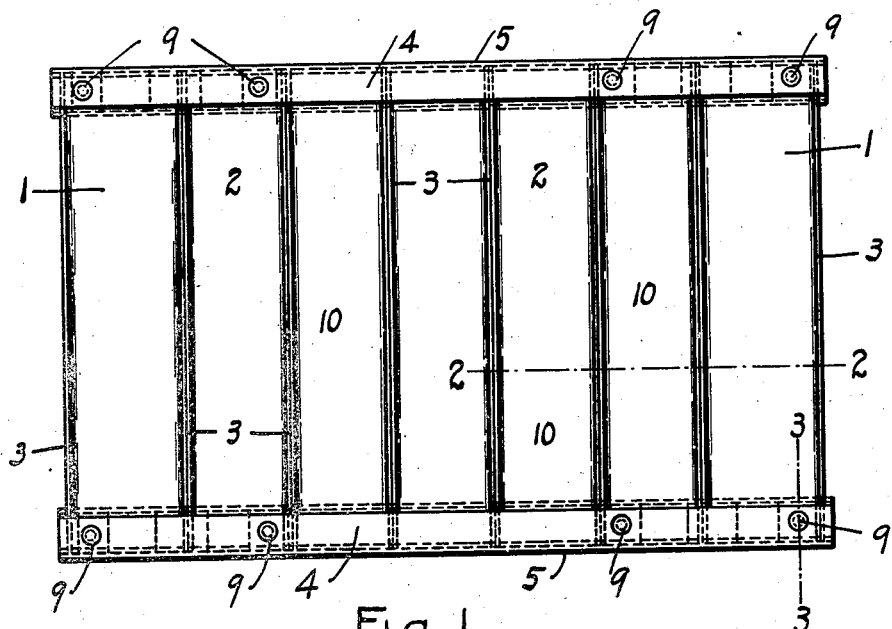

W. STUEBING, Jr.
PLATFORM.
APPLICATION FILED NOV. 5, 1920.

1,374,613.

Patented Apr. 12, 1921.

INVENTOR
William Stuebing Jr.
By John W. Frehli
ATTORNEY.

UNITED STATES PATENT OFFICE.

WILLIAM STUEBING, JR., OF CINCINNATI, OHIO.

PLATFORM.

1,374,613.

Specification of Letters Patent. Patented Apr. 12, 1921.

Application filed November 5, 1920. Serial No. 421,995.

*To all whom it may concern:*

Be it known that I, WILLIAM STUEBING, Jr., a citizen of the United States, residing at the city of Cincinnati, in the county of Hamilton and State of Ohio, have invented certain new and useful Improvements in Platforms, of which the following is a specification.

The present invention belongs more particularly to that class of platforms used in connection with lifting or elevating trucks. The load or weight to be carried by the lifting truck is usually placed upon platforms of this character, and, when it is desired to move one of these loaded platforms, the lifting truck is steered underneath said platform, and by manipulating the handle of the lifting truck, certain mechanism is brought into action, through means of which the upper elevating platform of the truck, which is mounted for up and down movement on the wheeled base frame of said truck, is moved upwardly, and the platform face resting thereon, is moved upwardly with it until it is in a locked elevated position; the lifting platform with its load having thus been raised off the floor; the truck can then be steered to any point or place, carrying the loaded platform with it; when the elevated frame of the lifting truck is lowered, the weighted platform moves down with it until it rests on the floor; then the lifting truck can be moved out from under the loaded platform, ready to move another loaded platform.

Platforms of this character are made in many forms, in order to adapt them for various specific uses. While the present platform herein described is particularly adapted to be placed at some point or points where it can be loaded for some special purpose, and in some special manner, as will be hereinafter described, it can also be used as the ordinary platform with a plain flat face. The face of this platform is divided into compartments, receptacles or box-like formations, in order to receive goods or articles as they are finished at a machine or some place in the factory or plant, in order to carry and hold these articles in these compartments or receptacles, until they are loaded, and then they are moved to another place for further work thereon, or to a place of final destination; thus, for example, this platform is placed next to a lathe, where certain sized shafts or studs are being made; as each article is finished, or the work intended to be done thereon has been done by the workman, they are placed in these compartments, and when the compartments are full, the platform can be moved away on the elevating or lifting truck.

My invention consists essentially in using a multiplicity of channel iron plates formed of a face and at each side having a flange or wing; placing these plates contiguous so that their flanges abut and their faces form the bottom of a series of compartments; binding the edges with metal so that the structure will be strong, and so that there can be no lateral or endwise play; said metal binding also preventing any of the articles in the compartments from falling out at the side, and placing metal supports at each side end of the platform face, formed of said channel iron plates, and binding all the parts together to form an iron structure.

Figure 2:
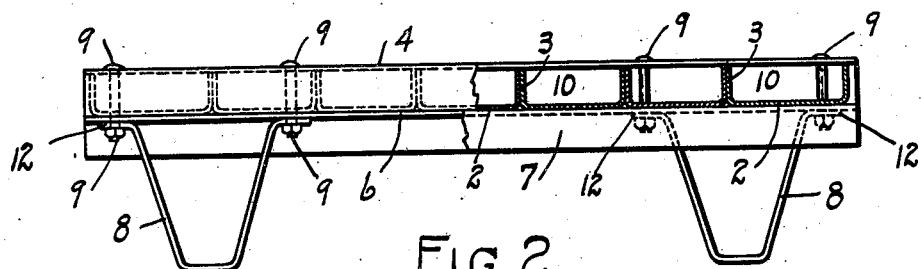
Figures 3, 4:
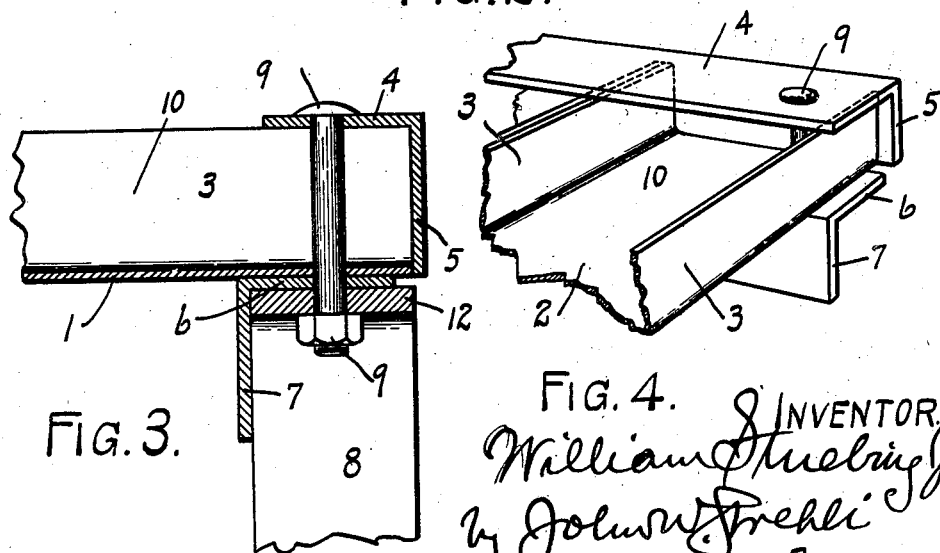

In the accompanying drawing, forming a part of this specification:

Figure 1, is a plan view of my new platform,

Fig. 2, is a side elevation thereof, partly in section, taken on the line 2—2 of Fig. 1, Fig. 3, is a sectional view taken on the line 3—3 of Fig. 1, and Fig. 4, is a fragmentary isometric view of one corner of the truck. In the present instance, in order to carry my invention into practice, I form the face or top of the platform of a multiplicity of channel iron plates 1, formed of a bottom 2, 2 with side walls or wings 3, 3, extending upwardly, thus forming receptacles or compartments 10; these channel iron face plates lie contiguous, their meeting flanges or wings 3, 3 abutting. In order to hold these channel iron compartments together and in alinement, I place a metal binding along each side edge thereof and hold the same in rigid position. This metal binding, in the present instance, is made up of an upper and a lower angle iron. The upper angle iron is composed of the top wing 4 and the side wing 5; the wing 4 lying along the top face edge of said channel plates and the side wing 5 extending downwardly over the end face of said plates; the lower channel iron having its top face 6 lying along the lower face edge of said channel iron plates, and its wings 7 extending downwardly at the inner end of said wing 6 and, if desired, abutting against the side of the legs or supports 8, see particularly Fig. 3. I use supports or legs for holding the platform face elevated, so that the lifting truck can be placed thereunder. These supports are marked 8 and are of approximately U shape, extending upwardly and outwardly and terminating in flanges 12, one at each side. These supports are connected to the platform face and to the steel bound sides by means of bolt and nut connections 9 passing through said plates 1 and through the wing 4 of the top angle iron and through the wing 6 of the lower angle iron and through the flanges 12 of the supports, forming a rigid construction to hold the plates, angle irons and supports together, and in alinement, forming a strong, durable and unique construction, possessing great utility.

I may form these channel iron face plates of any height and width, and make some smaller and others larger and I may connect them together in any other manner than specifically herein set forth. While all the parts of this platform are made of metal they may be made of any other material which will be found desirable and adaptable for the practical use of the platform.

What I claim as new and my invention and desire to secure by Letters Patent is:

1. In a platform of the character described, a face therefor, formed of a multiplicity of channel iron plates, lying contiguous, and arranged with their faces at the bottom, the flanges or wings thereof extending upwardly to form compartments, in combination with angle irons lying at the side edges of said channel iron plates, supports for said platform face and means for rigidly connecting said plates, angle irons and supports together to form a structure.

2. In a platform of the character described, a multiplicity of channel iron plates arranged to form compartments and making a face for said platform, a steel binding for each side edge of said channel irons, supports for holding the platform face elevated, arranged at each side edge thereof, and bolt and nut connections for holding said supports, said channel irons and said binding strips together and in alinement, to form a rigid construction.

In testimony whereof, I affix my signature at Cincinnati, Ohio, this 23rd day of October, 1920.

WILLIAM STUEBING, Jr.